United States Patent [19]

Thompson et al.

[11] Patent Number: 5,447,055
[45] Date of Patent: Sep. 5, 1995

[54] AUTOMATED LEAK DETECTION APPARATUS AND METHOD

[75] Inventors: Glenn M. Thompson; William E. Pfeil; Owen D. Evans, all of Tucson, Ariz.

[73] Assignee: Tracer Research Corporation, Tucson, Ariz.

[21] Appl. No.: 15,611

[22] Filed: Feb. 9, 1993

[51] Int. Cl.⁶ .......................... G01N 1/02; G08B 19/00
[52] U.S. Cl. ........................... 73/49.2; 73/40.7; 73/23.35
[58] Field of Search ............... 73/49.2, 40.7, 23.35, 73/23.42, 23.41

[56] References Cited

U.S. PATENT DOCUMENTS

| | | | |
|---|---|---|---|
| 2,928,247 | 3/1960 | Hubbell | 73/40.7 |
| 3,451,255 | 6/1969 | Neville et al. | 73/23.41 |
| 4,116,046 | 8/1977 | Stein | 73/61.1 |
| 4,499,752 | 6/1983 | Fruzetti et al. | 73/40.7 |
| 4,618,855 | 10/1983 | Harding et al. | 340/605 |
| 4,621,534 | 6/1984 | Munari et al. | 73/864.86 |
| 4,648,260 | 5/1985 | Zuckerman | 73/23.1 |
| 4,709,577 | 11/1986 | Thompson | 73/40.7 |
| 4,725,551 | 11/1986 | Thompson | 436/3 |
| 4,740,777 | 4/1988 | Slocum et al. | 340/522 |
| 4,754,136 | 6/1988 | Blakely | 250/301 |
| 4,760,732 | 6/1988 | Bredeweg et al. | 73/23.1 |
| 4,773,256 | 9/1988 | Saulgeot | 73/40.7 |
| 4,808,820 | 9/1988 | Blau | 250/281 |
| 4,835,708 | 9/1988 | Frans | 364/497 |
| 5,046,353 | 1/1989 | Thompson | 73/40.7 |
| 5,048,324 | 9/1991 | Thompson | 73/40.7 |

FOREIGN PATENT DOCUMENTS

| | | | |
|---|---|---|---|
| 804313 | 2/1974 | Belgium . | |
| 2353096 | 4/1975 | Germany . | |
| 135242 | 4/1979 | Germany | 73/23.41 |
| 1306351 | 2/1973 | United Kingdom . | |

Primary Examiner—Hezron E. Williams
Assistant Examiner—J. David Wiggins
Attorney, Agent, or Firm—David G. Rosenbaum

[57] ABSTRACT

A system for automated soil gas sampling, analysis and reporting to determine the presence and magnitude of a fluid leak from fluid storage vessels by detecting the presence of a unique and identifiable tracer chemical in the fluid leak. The system includes an array of sampling probes disposed in earthen material supporting fluid storage vessels. Each of the sampling probes is connected to a first valve selectable between individual sampling probes in the array. The first valve is connected to a second valve which communicates a gas sample from the first valve to a sample loop and loads the gas sample into the sample loop. Switching of the second valve from the first valve to a carrier gas source introduces a pressurized carrier gas into the sample loop displacing the gas sample out of the sample loop and into a gas chromatograph for analysis. A process controller governs all switching functions of the valves, actuation of the vacuum pump and the gas chromatograph in accordance with a pre-programmed instruction set. Data output by the gas chromatograph is processed to determine the presence of a tracer in the soil gas sample and actuate a signal flag indicative of the presence of the tracer chemical in the soil gas sample.

27 Claims, 3 Drawing Sheets

AUTOMATED LEAK DETECTION APPARATUS AND METHOD

BACKGROUND OF THE INVENTION

The present invention relates generally to leak detection systems for detecting fluid leaks from fluid storage tanks using distinctive tracer compounds to provide detectable components in a fluid leak from the tank. More particularly, the present invention relates to a system for automated soil gas sampling, analysis and reporting to determine the presence and magnitude of a fluid leak from a fluid storage tank. The present invention exhibits utility whether used to detect leaks in underground fluid storage tanks, aboveground fluid storage tanks or in fluid transfer pipelines. For purposes of clarity all such vessels shall be referred to as fluid storage tanks. The fluid stored in the fluid storage tank may be either a liquid, such as gasoline, or may be a gas, such as methane, natural gas, butane, propane or the like.

The present invention further provides a tracer leak detection method which relies upon the addition of a highly volatile liquid chemical to fluid contained within the fluid storage tanks. These tracer chemicals provide a unique and identifiable analytical signature. This signature is then used to detect and localize very small leaks from fluid storage tanks.

When a leak occurs in the fluid storage tank, the leaking fluid will contain a quantity of the tracer chemical. The tracer escapes from the fluid by vaporization and disperses into the surrounding soil by molecular diffusion. Soil gas samples are collected from the subsurface soil area by withdrawing a volume of soil gas through at least one sample probe disposed in an array in proximity to the fluid storage tank. Gas chromatography of the collected soil gas samples reveals the presence of the gas phase tracer, if any is present in the collected sample. The selection of tracer is important to insure that it provides a unique signature for gas chromatography.

The type of tracer chemicals useful in the present invention are more fully described in U.S. Pat. Nos. 4,725,551 and 4,709,557 issued to Glenn Thompson (hereinafter the "'551 Patent" and the "'557 Patent", respectively) the disclosures and teachings of which are expressly incorporated herein. Ideally, the selected tracer is normally a highly volatile organic tracer having a boiling point in the range of about $-72°$ C. to about $150°$ C., with the preferred compounds being of the group known as fluorinated halocarbons, commonly referred to as halocarbons or fluorocarbons.

A wide variety of different soil gas sampling leak detection methodologies are known. Common to each of these methods is the provision of some means for collecting soil gas samples. For example in each of the '551 and '557 patents a sampling probe is vertically disposed in the backfill material surrounding an underground tank. The sampling probe has a plurality of apertures to permit soil gases to enter the probe for subsequent evacuation. It is also well known to employ carbon adsorbents in the sampling probe to collect hydrocarbons or tracer chemicals for subsequent collection by desorbtion from the carbon and analysis of the desorbed gas. Similarly, U.S. Pat. No. 4,754,136 discloses that a neutron back scatter gauge may be lowered into the sampling probe to determine whether the probe contains volatile organic material indicative of a leak from a fluid storage tank. A positive neutron back scatter reading is verified by running a gas chromatogram on a soil gas sample collected from the sampling probe and comparing the chromatographic signature with the known material in the fluid storage tank.

Each of these leak detection systems require that a soil gas sample be taken from the sampling probe then analyzed on a gas chromatograph. None of these systems, however, provide a means for continuously monitoring the status of the tanks. It has been found desirable, therefore, to provide a system for automatically and continuously monitoring the leakage status of a fluid storage tank.

SUMMARY OF THE INVENTION

It is, therefore, a principal object of the present invention to provide a system for automatically and continuously monitoring the leakage status of a fluid storage tank. This objective is achieved by providing a computer-based controller, having pre-programmed process control software, which links the sampling probes in close proximity to the fluid storage tank with a gas chromatograph for analysis of soil gas samples. The controller oversees test scheduling, soil gas sampling, soil gas analysis, data processing, data storage and data reporting functions of the inventive leak testing system.

The present invention comprises a plurality of gas lines coupled to each of a plurality of sampling probes disposed in an array in close proximity to a fluid storage tank. Each of the plurality of gas lines are connected, at a first end, to the sampling probes such that soil gas samples can be evacuated by application of negative pressure to the gas line thereby drawing a soil gas sample from the sampling probe and through the gas line. Each of the plurality of gas lines are also connected, at a second end, to a first valve. The first valve is preferably switchable between each of the plurality of gas lines, such that each of the plurality of gas lines are individually accessed. The first valve is also preferably switchable between the plurality of gas lines and a standard or control source for calibration purposes. The first valve is in fluid flow communication with a second valve. It is preferable to interpose a water trap between the first valve and second valve to remove any existing water vapor from the gas sample. The second valve is a two-way valve switchable between a sample gas load position and a sample gas inject position. The second valve is connected to a carrier gas source. The carrier gas source provides a carrier gas for transporting a soil gas sample into a gas chromatograph under pressure. A sample loop is provided as a storage area for loading a gas sample and injecting the gas sample into the gas chromatograph. Thus, the second valve communicates with the sample loop and switches the sample loop between the load and inject functions.

Standards or controls can be run by switching the first valve from its connection with the plurality of gas lines to a source of a gas standard. Each of the second and third valves are then set to sequence between the load and inject functions as described above. The sample is released into the gas chromatograph by setting the second valve to the inject position and allowing the carrier gas flow to displace the sample into the gas chromatograph.

Each of the first, second and third valves and the pump are electrically coupled to a process controller. The process controller directs all switching functions in response to a pre-programmed instruction set in software loaded onto the process controller. The process controller may be programmed to automatically schedule a series of test events, individual test events or may be accessed to manually override the automatic pre-set functions.

Gas chromatographs typically generate an analog signal output representative of the chemical signature of a detected component. The chemical signature is represented by at least one peak having a given elution position. The area underneath the peak is representative of the amount of the detected component. The analog signal output by the gas chromatograph is sent to an integrator which determines the area of the peak. The peak position and area data are then output from the integrator to the process controller. The process controller is pre-programmed with the peak position and concentration identifiers of a unique tracer added to the fluid storage tank being tested, or with a library of peak position and concentration identifiers of all tracers potentially in use at a given fluid storage tank site. The process controller compares the digital input to the pre-programmed identifiers and displays a textual and or graphical display of the detected peaks, compares the detected peak to the pre-programmed identification data. The process controller then determines i) whether the detectable tracer is present in the soil gas sample, and ii) if so, its concentration level. If the tracer is present, or is present at a concentration greater than a pre-determined level, an alarm mode is activated to warn of an unacceptable leak condition. The process controller is coupled to a storage device, such as a hard disk drive, a tape drive or a CD-WORM (Compact Disc-Write Once Read-Only Memory) drive for archival storage of the test data.

These and other objects, features and advantages of the present invention will become more apparent to those skilled in the art from the following more detailed description of the preferred embodiments of the invention taken with reference to the accompanying drawings.

BRIEF DESCRIPTION OF THE DRAWINGS

FIG. 5 is a continuation of the process flow diagram of FIG. 4.

DETAILED DESCRIPTION OF THE PREFERRED EMBODIMENTS

Figure 1A:
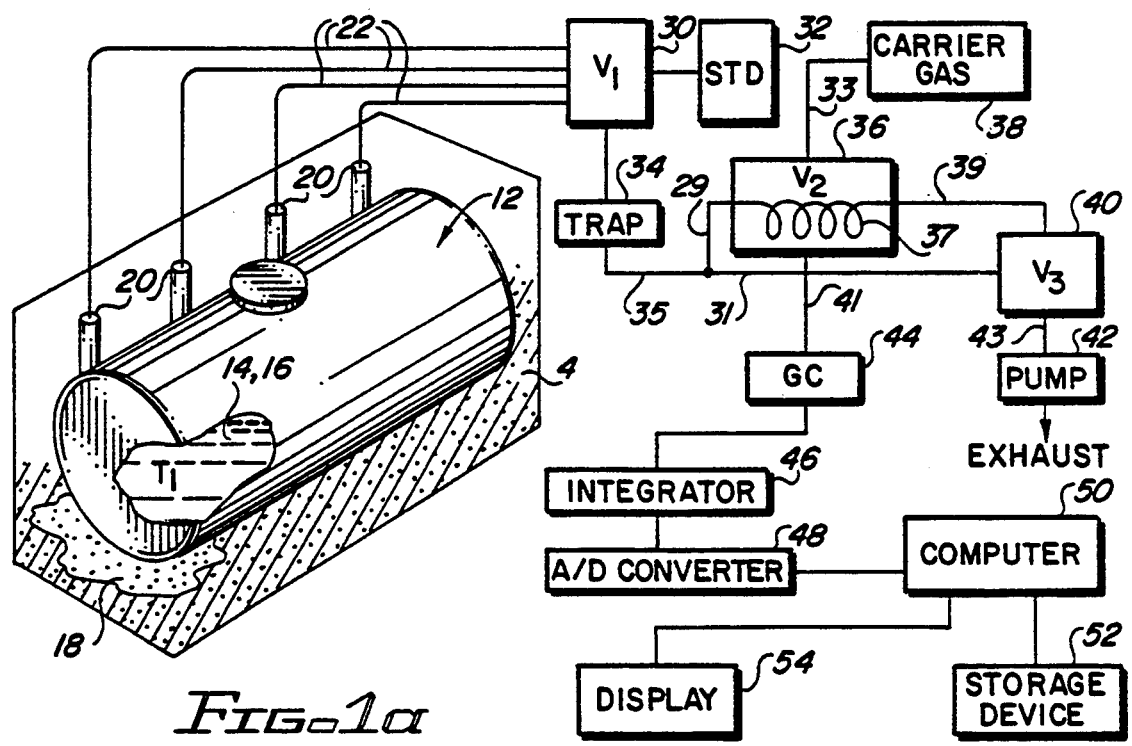
FIG. 1a is a diagrammatic view of the automated leak detection system in accordance with the present invention.

The inventive system for automated and continuous monitoring of fluid storage tanks is illustrated in the accompanying drawings. With specific reference to FIG. 1a there is shown the inventive system 10. A fluid storage tank 12 is supported by an earthen material 4, such as a backfill of soil, pea gravel or sand. While an underground subsurface fluid storage tank 12 is illustrated, those skilled in the art will understand and appreciate that any type of fluid containing vessel, such as an aboveground tank or a fluid pipeline, can be substituted for fluid storage tank 12. A fluid 14, such as a gas or liquid, is contained within the fluid storage tank 12 and is dispensed therefrom by appropriate connectors and pumps which are not shown. A tracer chemical 16 is introduced into the fluid 14 within fluid storage tank. Preferred tracer chemicals are described in greater detail in the Thompson '551 and '557 Patents which are expressly incorporated by reference thereto. A fluid leak 18 causes the tracer chemical 16 to also leak into the earthen material 4, thereby providing a unique detectable component in the earthen material 4.

A plurality of sample probes 20 are disposed in an array in proximity to the fluid storage tank 12. The plurality of sample probes 20 are gas permeable tubular members which permit the tracer chemical 16 to pass into the lumen of the tubular members either by molecular diffusion or under negative pressure. In accordance with the best modes known for the present invention, the sample probes 20 may be galvanized steel pipes having openings to permit soil gases to pass through the pipe walls and into the lumen of the pipe. These type of sample probes 20 are described in the Thompson '551 and '557 Patents. Alternatively, the sample probes 20 may be made of a sintered plastic material such as described in Thompson, U.S. Pat. No. 5,046,353, or of a plastic material, such as polyvinylchloride (PVC), as described in Thompson, U.S. Pat. No. 5,048,324, both of which are hereby expressly incorporated by reference. Additionally, the sample probes 20 may include a sampling tube that permits the tracer to enter the lumen by molecular diffusion through the tube walls.

Each of the plurality of sample probes 20 has a fluid conduit 22 connected to the sample probe 20. Fluid conduit 22 is connected, at a first end, to the sample probe 20 to allow soil gas samples to be withdrawn from the sample probe 20 through the fluid conduit 22. Thus, a fluid flow connection is provided between the fluid conduit 22 and the sample probe 20. Each of the fluid conduit 22 is connected, at a second end, to a first valve 30. A source of a calibration standard 32 is provided in fluid flow communication with the first valve 30. First valve 30 may be a rotary valve or a solenoid valve switchable between each of the individual fluid conduits 22 and the source of the calibration standard 32. Alternatively, the first valve 30 may comprise a plurality of individual valves, wherein one individual valve communicates with one of the plurality of fluid conduits 22. Thus, first valve 30 can be actuated to select either the calibration standard 32 or one of the individual fluid conduits 22 leading from the sample probes 20.

A second valve 36 is provided in fluid flow communication with the first valve 30. It is preferable to interpose a water trap 34 in the connection line 35 between the first valve 30, the second valve 36 and the third valve 40. Water trap 34 removes water from soil gas samples withdrawn from the sample probes 20 before further downstream handling by system 10. If liquid water is entrained in the soil gas sample, the presence of water trap 34 is especially desirable.

A carrier gas source 38 is provided in fluid flow communication with the second valve 36. Carrier gas source 38 provides a carrier gas suitable for gas chromatography. The second valve 36 is switchable between accepting input from the carrier gas source 38 or from incoming connection line 35 from the first valve 30. Correspondingly, the second valve 36 is switchable between output connections with the third valve 40 and a gas chromatograph 44. A sample loop 37 is associated with the second valve 36. Both the input and output positions of the sample loop 37 are governed by the second valve 36. Sample loop 37 serves as a conduit for loading a soil gas sample under the influence of the vacuum pump 42 and dispensing the soil gas sample under the influence of the carrier gas. The third valve 40 is switchable to draw a vacuum either through a sample loop bypass line 31 or through the sample loop 37. A connection line 43 connects third valve 40 in fluid flow communication with the vacuum pump 42.

The second valve 36 is switchable between a sample load position to the sample loop 37 and a sample inject position from the sample loop 37 to the gas chromatograph.

In the sample load position, the second valve 36 is connected to a sample loop input line 29 and to a sample load output line 39 in communication with the third valve 40. The sample loop 37 has a small volume relative to the entire evacuation line and is generally unsuitable for efficient large volume evacuation required to draw a soil gas sample from the sample probe 20 into the sample loop 37. The sample loop bypass line 31, connecting the water trap 34 and the third valve 40, bypasses the sample loop and connects the first valve 30, and the fluid conduits 22 to the vacuum pump 42. Efficient sample loading entails switching the third valve 40 to bypass the sample loop 37 and draw soil gas from the sample loop bypass line 31 through vacuum pump 42. A volume equal to the volume of the line from the probe 20 to the pump is evacuated to ensure that soil gas from the probe 20 is present in the system 10. The third valve 40 is then switched to evacuate through the sample loop 37, thereby drawing soil gas into the sample loop 37.

It should be apparent to those skilled in the art that the third valve 40 is required only when a flow restricting sample loop 37 is employed. Where a flow non-restricting sample loop 37 is employed it is not necessary to by-pass the sample loop 37 in order to efficiently evacuate a sufficiently large volume to ensure that soil gas is present in the sample loop 37. Accordingly, while reference is made to the presence of the third valve 40, both the system 10 and the operation of the system 10 do not require its presence or function for sample loading to the sample loop 37.

In the sample inject position, the second valve 36 switched to position the sample loop 37 to accept input from the carrier gas source 38 and output to the gas chromatograph 44 through the connection line 41. In this manner, a pressurized carrier gas from carrier gas source 38 displaces the soil gas sample resident in the sample loop 37 and forces the soil gas sample through the connection line 41 and into the gas chromatograph 44 for analysis.

Gas chromatograph 44 is of standard construction. After receiving and analyzing an input soil gas sample, the gas chromatograph 44 generates a data signal, typically an analog signal, which is output to an integrator 46. Integrator 46 is also of standard construction. Integrator 46 interpolates the data signal from the gas chromatograph 44 and outputs an integrated data signal containing identification data for the gas sample. Gas chromatograph 44 separates detectable components in the soil gas sample into peaks having a specific elution position, elution order and area underneath the peak. The elution position and elution order represents the specific detectable component, while the area underneath the peak represents its concentration. The integrated data signal output from integrator 46 is typically an analog signal. To enable digital processing, the analog integrated data signal is converted to a digital signal by analog-digital converter 48. The digital signal is then output to a process controller 50, such as a computer, having associated display 54 and storage 52 devices.

The process controller 50 is preferably electrically coupled to each of the first, second and third valves, and the vacuum pump 42 to oversee switching and actuation functions in accordance with a pre-programmed instruction set resident at the process controller 50. This pre-programmed instruction is preferably a computer program which may reside on the storage device 52, or may be encoded in an integrated circuit incorporated in the process controller 50.

Figure 1B:
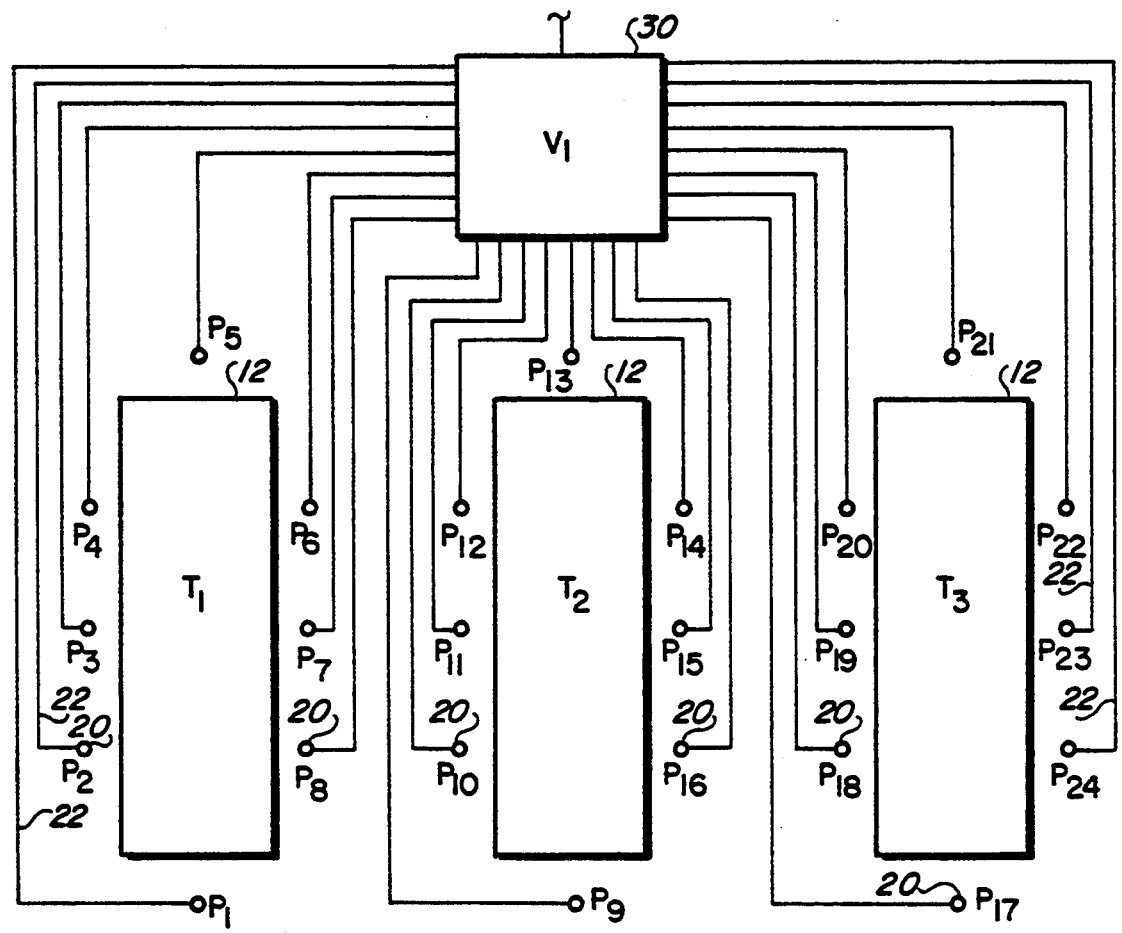
FIG. 1b is a diagrammatic view of a sampling probe array for a plurality of fluid storage tanks in accordance with the present invention.

Those skilled in the art will understand that a plurality of fluid storage tanks may be monitored by the system 10 of the present invention. FIG. 1b diagrammatically illustrates a tank field having a plurality of fluid storage tanks 12, labeled T1, T2 and T3 for illustration purposes. A plurality of sample probes 20, labeled P1–P24, are provided in an array surrounding each of the plurality of fluid storage tanks 12. Fluid conduit members 22 connect each of the plurality of sample probes 20 to the first valve 30. In this case, where there are provided 24 probes P1–P24, the first valve 30 is switchable between each individual sample probe 20. In this manner, a soil gas sample is obtainable from each sample probe 20 independent of other sample probes 20 in the array.

Operation of the inventive system 10 is directed by the process controller processor 50. The pre-programmed instruction set resident at the process controller 50 is a computer program which directs operation of system 10 in the manner illustrated in FIGS. 2–5.

Figure 2:
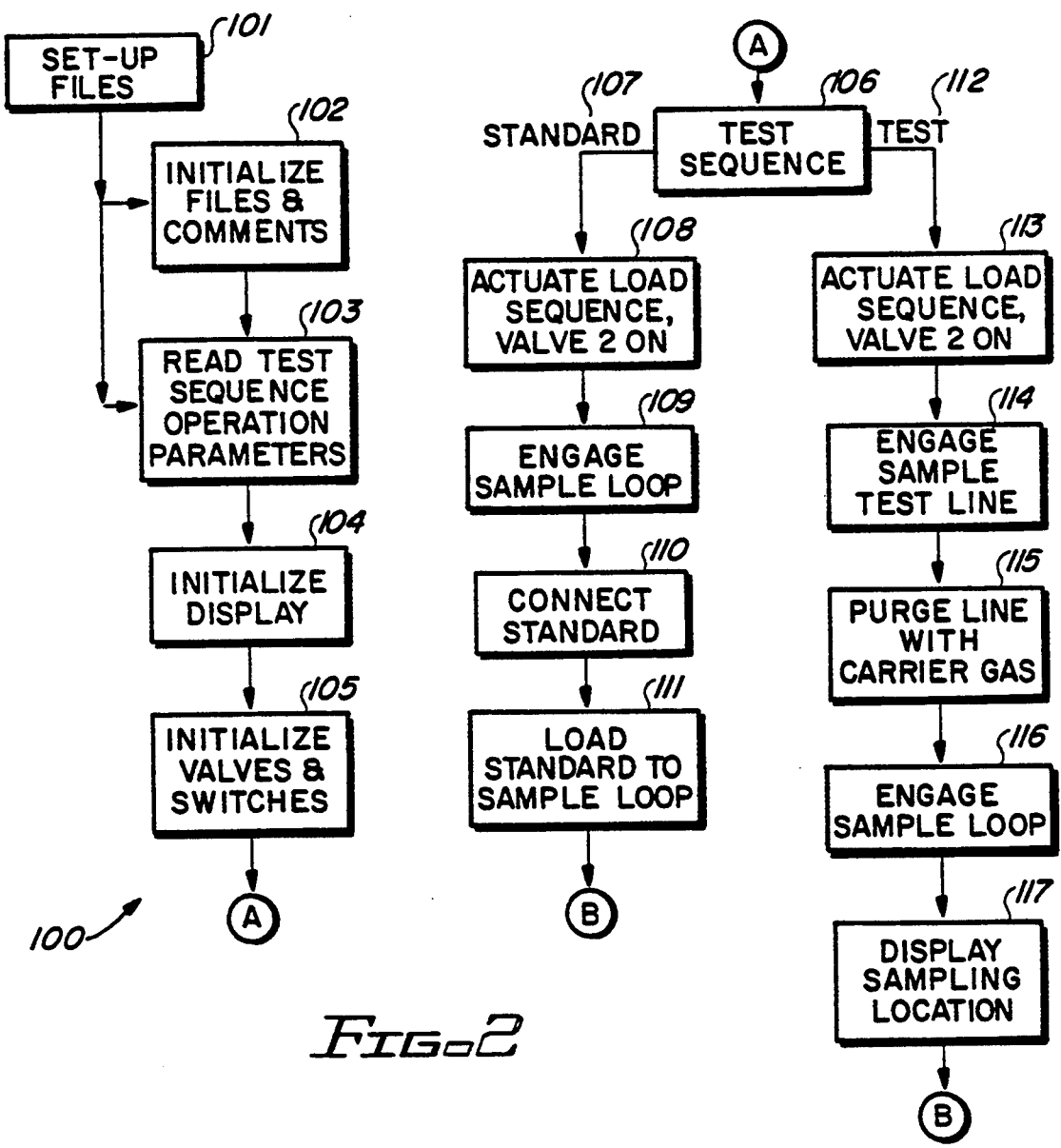
FIG. 2 is a process flow diagram illustrating the initialization and loading routines in accordance with the method of the present invention.

FIG. 2 illustrates the initialization and test load sequences in accordance with the inventive test method 100. Set up files 101 are provided with information relating to tracer signatures, operational parameters, scheduling, test frequency, etc. The set up files 101 are read and the control files and comments are initialized 102. Test sequence and operational parameters 103 are read from the set-up files 101 and the display is initialized 104 to confirm the initialized settings. Upon confirmation, each of the first, second and third valves and any additional switches for the vacuum pump, gas chromatograph and integrator are initialized 105. Once the system initialization routines are completed, the testing sequence 106 is started.

Testing sequence 106 is governed by the set-up data to run either a calibration standard 107 or a tracer test 112. If the calibration standard 107 is selected, the second valve is actuated to the load position 108, the sample loop is engaged by actuating engagement between the first valve 109 and the calibration standard source 110 and the calibration standard is loaded from the calibration standard source, through the first and second valves to the sample loop 111. If the tracer test mode 112 is selected, the second valve is actuated to the load position 113, the first valve is switched to engage the fluid conduit lines to the sample probes 114, the sample line is purged with the carrier gas 115, the second valve is actuated to engage the sample loop 116 and the sample probe location is displayed at the process controller 117. During each of the foregoing steps in the tracer test sequence 112, the vacuum pump creates a negative pressure in the connection lines and the fluid conduits connecting the sample probes to the first valve, thereby evacuating soil gas samples from the sample probes into the system 10.

Figure 3:
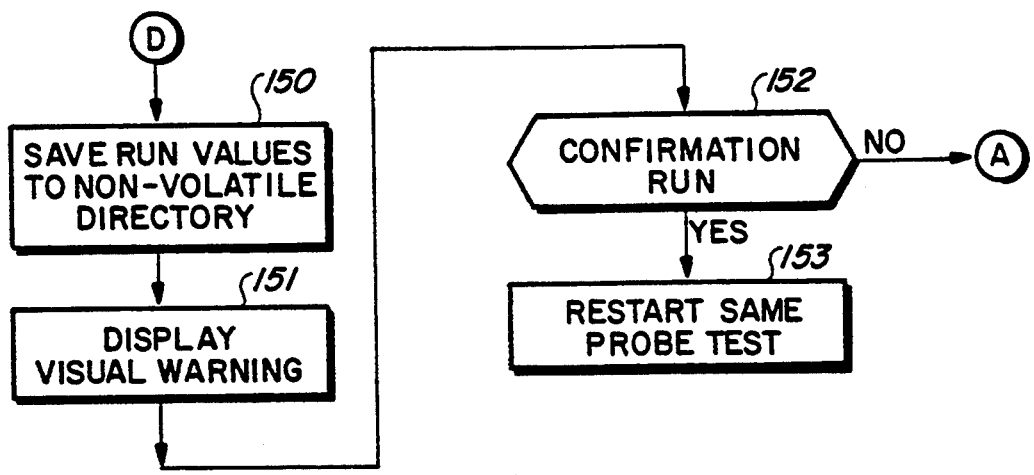
FIG. 3 is a process flow diagram illustrating the sample injection routines in accordance with the method of the present invention.
Figure 3:
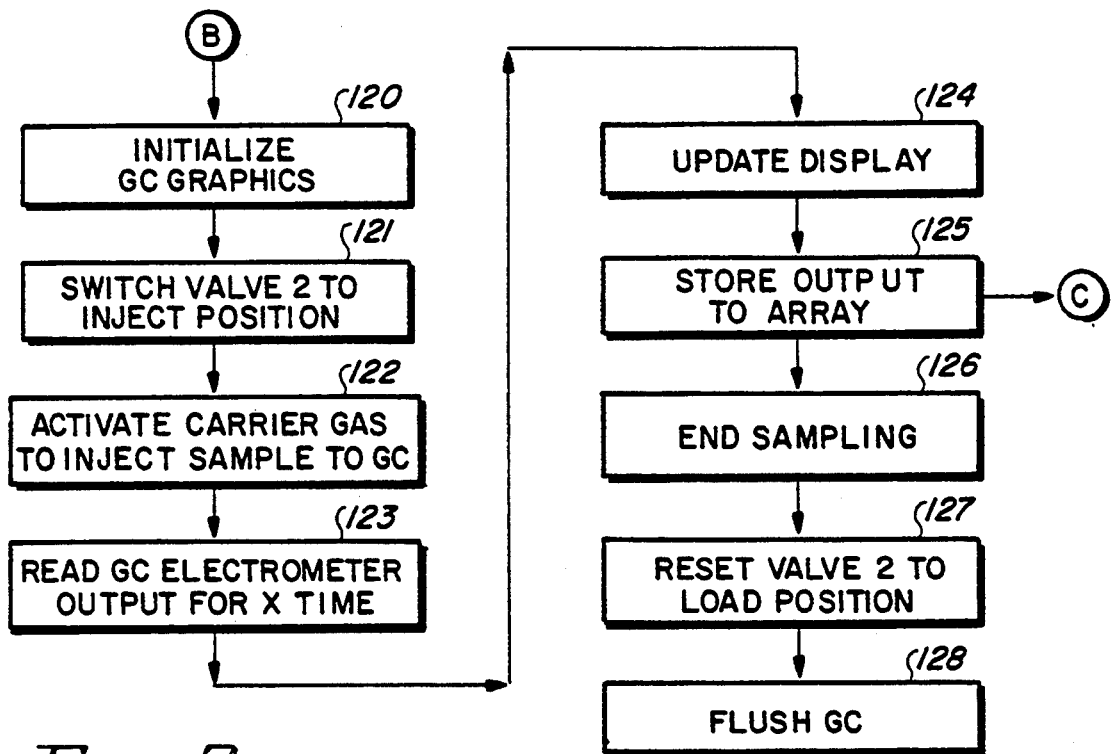

FIG. 3 represents the injection sequence for conveying a gas sample loaded onto the sample loop into the gas chromatograph. The gas chromatograph graphic function is initialized by the process controller. The vacuum pump is turned off by actuating the third valve to communicate with the gas chromatograph. The second valve is switched to the inject position 121. The carrier gas source is activated to inject a volume of the carrier gas into the sample loop, thereby displacing the soil gas sample loaded into the sample loop out of the sample loop and into the gas chromatograph 122. The process controller then reads the gas chromatograph electrometer output for a time X, read from the set-up file, 123, processes the output to digital signal form and updates the display to output graphical display of the chromatogram 124. The output data signal from the gas chromatograph is then stored to a data array maintained in data files on the storage device 125. The tracer test sequence ends 126 and the first valve is returned to the tracer test load position 127 and the gas chromatograph is flushed with carrier gas through the second valve 128.

Figure 4:
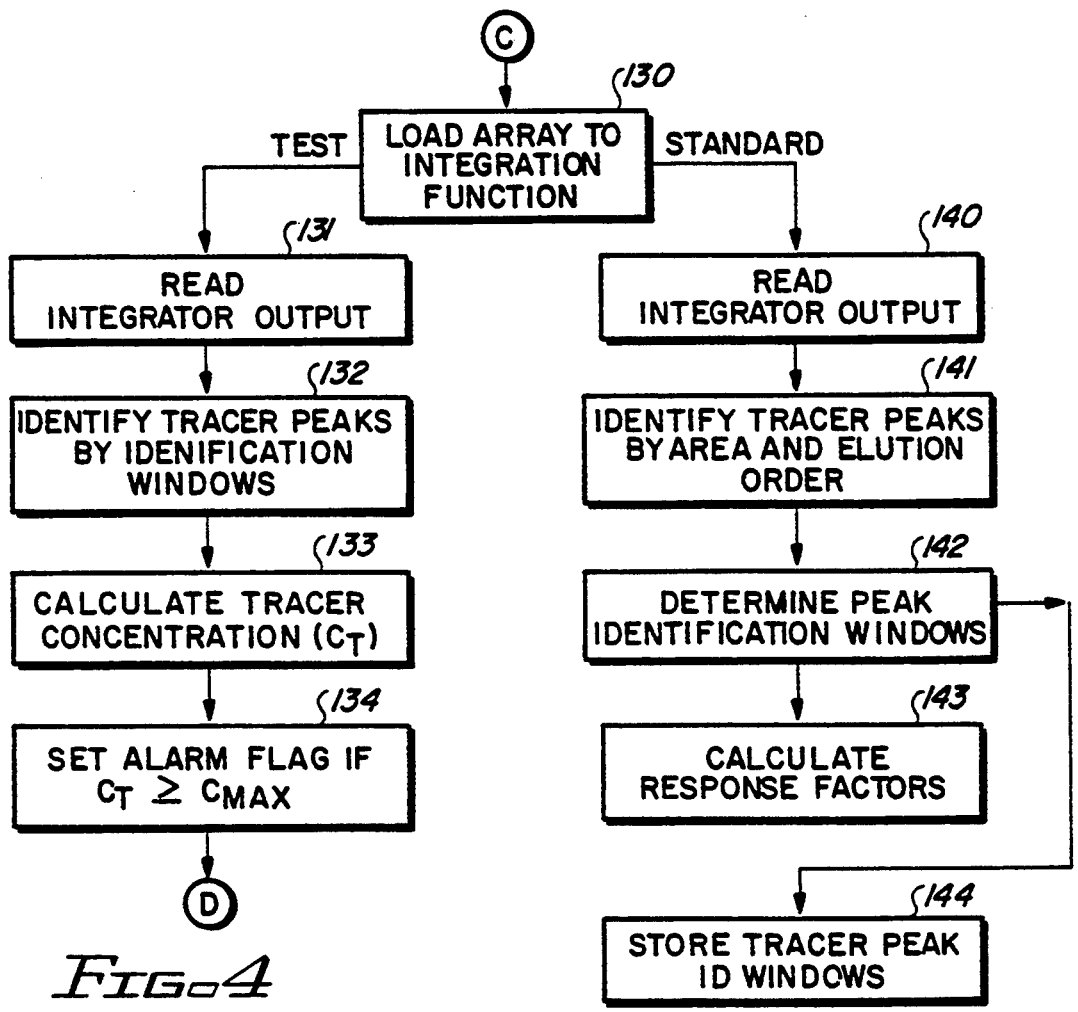
FIG. 4 is a process flow diagram illustrating data processing routines for gas chromatography data of a tested sample in accordance with the present invention.

Data processing of the output gas chromatograph signal is illustrated in FIGS. 4 and 5. The data array on the storage device is loaded to the integrator 130. The integrator has two functionalities. First, the integrator provides a calibration function, and second, the integrator provides a test function. In the standard function, the integrator output is read by the process controller 140 and tracer peaks are identified by elution order and area 141. Peak identification windows representative of both response factor 143 representative of elution position and concentration are determined 142 with reference to the known tracer doped with the fluid in the fluid storage tank and the acceptable leakage rate and correspondingly calculated tracer concentration. The peak identification windows are stored 144 to the storage device.

The integrator test function entails reading the integrator signal output 131, comparing peaks in the signal output from the integrator with the peak identification windows from the standard calibration function 132 for similarity of response functions, namely elution position and calculating tracer concentration $C_T$ 133 by the integrated area under the peak. If $C_T$ is greater than or equal to a pre-set acceptable maximum tracer concentration ($C_{max}$), an alarm or signal flag is set 134. The signal flag may consist of an audible alarm, a visual warning on the display, or a pre-programmed sequence whereby a host computer is automatically accessed and the signal flag communicated to the host computer thereby providing for remote monitoring of fluid storage tanks. The test sequence run values are stored to a non-volatile directory and files on the storage device 150. if the signal flag is actuated, and a visual warning displayed 151, a confirmation run 152 may be run by re-starting 153 the test sequence at the same probe in which the tracer was detected. If no confirmation run is selected, the entire process is restarted by advancing the first valve to the next available sample probe, flushing the connection lines with a carrier gas and re-starting the testing sequence as described above.

The process controller directs operation of the entire process 100 until all sample probes in the sample probe array have been tested for the presence of a tracer chemical. The process 100 is then re-started in accordance with a pre-set schedule as determined in the set up files. Alternatively, the process 100 may be remotely or locally initiated by manually overriding the automatic functions in the set up files and initializing a testing run.

From the foregoing, those skilled in the art will understand that the invention has been fully and fairly described in such a manner as to enable one skilled in the art to practice the invention. While the best mode for practicing the invention has been disclosed, those in the art will understand and appreciate that a wide variety of variations and substitutions may be made in, for example, individual valve and switch selections, connection line materials, tracer selection, tank or pipeline type and operational parameters without departing from the spirit and scope of the present invention.

What is claimed is:

1. A leak detection method for detecting fluid leakage on a repetitive cycling monitoring basis from at least one of a plurality of fluid storage vessels, including subsurface fluid storage tanks, aboveground fluid storage tanks and fluid pipelines disposed in or on an earthen material, comprising the steps of:

(a) doping the fluid contained with the at least one of a plurality of fluid storage vessels with a chemical tracer, the tracer having a gas chromatography signature separate and distinct from the fluid and from earthen material supporting the at least one of a plurality of fluid storage vessels and capable of molecular diffusion within the earthen material in the gas phase;

(b) disposing a plurality of sampling means for collecting soil gas samples, the plurality of sampling means forming an array in the earthen material in fluid flow proximity to the at least one of a plurality of fluid storage vessels, each of the plurality of sampling means having a gas conduit coupled thereto;

(c) selecting a first of the plurality of sampling means;

(d) evacuating a first soil gas sample from the first of the plurality of sampling means by applying a negative pressure to the first of the plurality of sampling means;

(e) loading the evacuated first soil gas sample into a sample loop by applying the negative pressure through the sample loop thereby moving the first soil gas sample from the first of the plurality of sampling means into the sample loop;

(f) connecting the sample loop to a gas chromatograph;

(g) flowing a carrier gas into and through the sample loop, thereby displacing the evacuated first soil gas sample out of the sample loop and into the gas chromatograph;

(h) analyzing the first soil gas sample in the gas chromatograph and outputting at least one data signal characterizing the soil gas sample from the gas chromatograph;

(i) processing the at least one data signal characterizing the soil gas sample from the gas chromatograph and interpolating the at least one data signal from the gas chromatograph and outputting an integrated data signal containing identification data from the gas sample from the gas chromatograph to determine the presence of tracer in the soil gas sample;

(j) activating a signal indicative of the detection of the tracer in the soil gas sample; and (k) repeating steps d) through j) until each of the plurality of sampling means in the array have been tested.

2. A system for detecting fluid leakage from at least one of a plurality of fluid storage vessels containing fluid with chemical tracer doped within, including subsurface fluid storage tanks, aboveground fluid storage tanks and fluid pipelines supported by an earthen material, comprising:

(a) a plurality of gas permeable sample probes that are tubular member disposed to form an array in the earthen material in fluid flow proximity to the at least one of a plurality of fluid storage vessels;

(b) a plurality of fluid conduit members having first and second ends thereof, the first end of each of the plurality of fluid conduit members being connected in fluid flow communication with a corresponding one of the plurality of gas permeable sample probes;

(c) first valve means connected to each of the plurality of fluid conduit members, the first valve means being selectably switchable between each of the plurality of fluid conduit members;

(d) second valve means in fluid flow communication with the first valve means;

(e) third valve means in fluid flow communication with said first valve means and second valve means and switchable therebetween to draw a vacuum through one of a sample loop bypass line and through said sample loop;

(f) a carrier gas source containing a carrier gas under positive pressure, the carrier gas source being connected in fluid flow communication with the second valve means;

(g) a sample loop connected in fluid flow communication with the second valve means;

(h) pumping means for providing a negative pressure in each of the plurality of sampling probes, the gas conduits, the first valve means and the second valve means and the sample loop, thereby evacuating soil gas samples therethrough;

(i) gas analysis means coupled to the second valve means; and (j) control processing means for controlling switching of each of the first, second and third valve means in response to a pre-programmed instruction set governing sequencing of evacuation of each of the sampling probes, loading of the sample loop with evacuated soil gas samples and injection of the evacuated soil gas samples from the sample loop into the gas analysis means.

3. The leak detection method of claim 1, wherein said step (a) further comprises the step of selecting a tracer chemical from the group consisting of fluorinated halocarbons, methanes, and ethanes.

4. The leak detection method of claim 1, wherein said tracer chemical has a boiling point in the range of about −72° C. to about 150° C.

5. The leak detection method of claim 1, wherein the tracer chemical has a boiling point less than the boiling point of the fluid doped with the tracer chemical.

6. The leak detection method of claim 1, wherein said step (a) further comprises doping the fluid contained within the fluid storage vessel with a tracer chemical to a concentration of about ten parts per million.

7. The leak detection method of claim 1, wherein said step (a) further comprises the step of selecting the tracer chemical from the group consisting of halogenated methanes, halogenated ethanes, sulfurhexafluoride, perfluorodecalin, and perfluoro 1,3 dimethylcyclohexane.

8. The leak detection method of claim 7, wherein the step of selecting the tracer chemical further comprises selecting a halogenated methane from the group consisting of chlorobromodifluoromethane, trichlorofluoromethane, trifluoroiodomethane, trifluorobromomethane, dibromodifluoromethane, dichlorodifluoromethane and tetrafluoromethane.

9. The leak detection method of claim 8, wherein the step of selecting the tracer chemical further comprises selecting a halogenated ethane selected from the group consisting of dichlorotetrafluoroethane, hexafluoroethane, trichlorotrifluoroethane, dibromotetrafluoroethane and tetrachlorodifluoroethane.

10. The leak detection method of claim 1, wherein said step of selecting a first of the plurality of sampling means further comprises the step of switching a first valve means for providing a fluid flow communication between the first of the plurality of sampling means and a pumping means for evacuating said first soil gas sample from the first of the plurality of sampling means.

11. The leak detection method of claim 10, wherein said step of loading the evacuated first soil gas sample into a sample loop further comprises the steps of:

(a) switching a second and a third valve means for providing a fluid flow communication between the sample loop and said pumping means;

(b) actuating the pumping means to draw a vacuum through the sample loop, the first, second and third valve means, and the probe means;

(c) operating the pumping means for a period of time to permit a soil gas sample to pass from the sampling means to the pumping means; and (d) switching said second and third valve means to isolate the sample loop from each of said sampling means, said first valve means and said pumping means.

12. The leak detection method of claim 11, wherein said step of operating the pumping means further comprises the step of operating the pumping means for a period of time greater than or equal to the product of the rate of evacuation times the static volume of the evacuation path from the probe means to the negative pressure source.

13. The leak detection method of claim 1, wherein said step of connecting the sample loop to a gas chromatograph further comprises switching valve means to provide a fluid flow communication between the sample loop, the carrier gas and the gas chromatograph.

14. The leak detection method of claim 1, further comprising the step of outputting control signals from a process controller, thereby governing each of the steps (a) through (k).

15. The leak detection method of claim 1, wherein said step of outputting an integrated data signal further comprises the step of converting said at least one data signal by an analog-digital converter.

16. The leak detection method of claim 1, wherein said step of activating a signal indicative of the detection of the tracer in the soil gas sample further comprises the step of activating an alarm when the tracer chemical is present at a concentration level greater than a pre-determined level therefore warning of an unacceptable leak condition.

17. The system of detecting fluid leakage of claim 2, wherein said plurality of gas permeable tubular members are comprised of at least one of a galvanized steel, a sintered plastic and a plastic material.

18. The system of detecting fluid leakage of claim 2, further comprising a source of a calibration standard chemical for gas chromatography connected to said first valve means, said first valve means being switchable between said source of a calibration standard chemical and said plurality of sample probes.

19. A system for detecting fluid leakage from at least one of a plurality of fluid storage vessels containing fluid with chemical tracer doped within including subsurface fluid storage tanks, aboveground fluid storage tanks and fluid pipelines supported by an earthen material, comprising:

(a) a plurality of gas permeable sample probes disposed to form an array in the earthen material in fluid flow proximity to the at least one of a plurality of fluid storage vessels;

(b) a plurality of fluid conduit members having first and second ends thereof, the first end of each of the plurality of fluid conduit members being connected in fluid flow communication with a corresponding one of the plurality of gas permeable sample probes;

(c) first valve means connected to each of the plurality of fluid conduit members, the first valve means being selectably switchable between each of the plurality of fluid conduit members;

(d) second valve means in fluid flow communication with the first valve means;

(e) third valve means in fluid flow communication with said first valve means and second valve means and switchable therebetween;

(f) a carrier gas source containing a carrier gas under positive pressure, the carrier gas source being connected in fluid flow communication with the second valve means;

(g) a sample loop connected in fluid flow communication with the second valve means;

(h) pumping means for providing a negative pressure in each of the plurality of sampling probes, the gas conduits, the first valve means and the second valve means and the sample loop, thereby evacuating soil gas samples therethrough;

(i) gas analysis means coupled to the second valve means; and (j) control processing means for controlling switching of each of the first, second and third valve means in response to a pre-programmed instruction set governing sequencing of evacuation of each of the sampling probes, loading of the sample loop with evacuated soil gas samples and injection of the evacuated soil gas samples from the sample loop into the gas analysis means;

wherein said second valve means is at least a two way valve, switchable between a connection between said pumping means and said plurality of sample probes and a connection between said carrier gas source and said gas analysis means.

20. The system of detecting fluid leakage of claim 2, wherein said carrier gas source contains a carrier gas under positive pressure which, upon connection to said sample loop, displaces said soil gas sample from said sample loop into said gas chromatography means under positive pressure.

21. The system of detecting fluid leakage of claim 20, further comprising at least one water trap disposed between said first valve means and said second valve means.

22. The system of detecting fluid leakage of claim 2, wherein said gas analysis means further comprises an integrator for interpolation of a data signal from said gas chromatography means prior to outputting an integrated data signal containing identification data from said gas sample.

23. The system of detecting fluid leakage of claim 21, wherein said control processing means further comprises a plurality of pre-programmed identifiers for comparison of said data signal from said gas chromatography means and means for outputting test data in the form of at least one of a textural and a graphical display.

24. The system for detecting fluid leakage of claim 22, wherein said control processing means further comprises a means for archival storage of said test data.

25. The system for detecting fluid leakage of claim 2, wherein said control processing means further comprises programming means for scheduling at least one of a series of test events and individual test events.

26. The system for detecting fluid leakage of claim 2, wherein said control processing means further comprises manual override means to disable automatic preset functioning of said control processing means.

27. The system for detecting fluid leakage of claim 2, further comprising an alarm which is activated if said tracer chemical is detected at a concentration greater than a predetermined level.

* * * * *